United States Patent
Lee et al.

(10) Patent No.: US 11,363,579 B2
(45) Date of Patent: Jun. 14, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Taewoo Lee, Sakai (JP); Shoichi Suzuki, Sakai (JP); Wataru Ouchi, Sakai (JP); Tomoki Yoshimura, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 23 days.

(21) Appl. No.: 16/954,508

(22) PCT Filed: Dec. 27, 2018

(86) PCT No.: PCT/JP2018/048137
§ 371 (c)(1),
(2) Date: Jun. 16, 2020

(87) PCT Pub. No.: WO2019/131878
PCT Pub. Date: Jul. 4, 2019

(65) Prior Publication Data
US 2021/0092732 A1 Mar. 25, 2021

(30) Foreign Application Priority Data

Dec. 28, 2017 (JP) .............................. JP2017-253557
Apr. 4, 2018 (JP) .............................. JP2018-072268

(51) Int. Cl.
*H04W 72/04* (2009.01)

(52) U.S. Cl.
CPC ... *H04W 72/0413* (2013.01); *H04W 72/0486* (2013.01)

(58) Field of Classification Search
CPC .......... H04W 72/0486; H04W 72/0413; H04L 1/0061; H04L 1/0013; H04L 1/0041;
(Continued)

(56) References Cited

U.S. PATENT DOCUMENTS

2013/0170443 A1* 7/2013 He .................... H04L 1/0026
370/329
2013/0322398 A1 12/2013 Jang et al.
(Continued)

FOREIGN PATENT DOCUMENTS

WO 2016/123372 A1 8/2016
WO WO2019/032802 * 2/2019 ............... H04L 5/00

OTHER PUBLICATIONS

"3rd Generation Partnership Project; Technical Specification Group Radio Access Network; NR; Physical channels and modulation(Release 15)", 3GPP TS 38.211 V2.0.0 (Dec. 2017).
(Continued)

*Primary Examiner* — Quoc Thai N Vu
(74) *Attorney, Agent, or Firm* — ScienBiziP, P.C.

(57) ABSTRACT

A terminal apparatus includes a transmitter configured to transmit a UCI payload with CRC bits by using a PUCCH, wherein a size of the CRC bits added to the UCI payload is a first size, and a number of PRBs of a resource of the PUCCH is given based on a second size of the CRC bits.

4 Claims, 10 Drawing Sheets

(58) Field of Classification Search
CPC ... H04L 1/0067; H04L 1/0072; H04L 1/0073; H04L 1/1671; H04L 1/1607; H04L 1/0057; H04L 5/0046; H04L 27/2602; H04L 27/2607
USPC .............................. 370/329, 310.2; 455/550.1
See application file for complete search history.

(56) References Cited

U.S. PATENT DOCUMENTS

| | | | |
|---|---|---|---|
| 2015/0043526 A1* | 2/2015 | Wang | H04L 1/0003 370/330 |
| 2015/0358124 A1* | 12/2015 | Suzuki | H04L 5/0053 370/329 |
| 2016/0295574 A1* | 10/2016 | Papasakellariou | H04W 52/146 |
| 2016/0353430 A1* | 12/2016 | Chen | H04L 5/0055 |
| 2018/0310321 A1* | 10/2018 | Basu Mallick | H04W 72/085 |
| 2019/0222387 A1* | 7/2019 | Wu | H04L 5/0046 |
| 2019/0268854 A1* | 8/2019 | Suzuki | H04W 52/146 |
| 2020/0028632 A1* | 1/2020 | Iyer | H04L 1/1614 |
| 2021/0184793 A1* | 6/2021 | Andersson | H04L 1/0061 |

OTHER PUBLICATIONS

"3rd Generation Partnership Project; Technical Specification Group Radio Access Network; NR; Multiplexing and channel coding(Release 15)", 3GPP TS 38.212 V2.0.0 (Dec. 2017).

"3rd Generation Partnership Project; Technical Specification Group Radio Access Network; NR; Physical layer procedures for control(Release 15)", 3GPP TS 38.213 V2.0.0 (Dec. 2017).

"3rd Generation Partnership Project; Technical Specification Group Radio Access Network; NR; Physical layer procedures for data(Release 15)", 3GPP TS 38.214 V2.0.0 (Dec. 2017).

Oppo, "Short-PUCCH for UCI of more than 2 bits", R1-1719992, 3GPP TSG RAN WG1 Meeting #91, Reno, USA, Nov. 27-Dec. 1, 2017.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-253557 filed on Dec. 28, 2017, and JP 2018-072268 filed on Apr. 4, 2018, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In the 3GPP, a new radio access method (hereinafter referred to as "New Radio (NR)") is being studied (NPLs 1, 2, 3, 4). In LTE, a base station apparatus is also referred to as an evolved NodeB (eNodeB). In NR, a base station apparatus is also referred to as a gNodeB. In LTE and NR, a terminal apparatus is also referred to as a User Equipment (UE). LTE, as well as NR, are cellular communication systems in which multiple areas are deployed in a cellular structure, with each of the multiple areas being covered by base station apparatuses. A single base station apparatus may manage multiple cells.

In NR, a set of a downlink BWP (bandwidth part) and an uplink BWP is configured for one serving cell (NPL 3). A terminal apparatus receives the PDCCH and the PDSCH in the downlink BWP.

CITATION LIST

Non Patent Literature

NPL 1: "3GPP TS 38.211 V2.0.0 (2017-12), NR; Physical channels and modulation", RP-172284, 7 Dec. 2017.
NPL 2: "3GPP TS 38.212 V2.0.0 (2017-12), NR; Multiplexing and channel coding", RP-172668, 7 Dec. 2017.
NPL 3: "3GPP TS 38.213 V2.0.0 (2017-12), NR; Physical layer procedures for control", RP-172703, 7 Dec. 2017.
NPL 4: "3GPP TS 38.214 V2.0.0 (2017-12), NR; Physical layer procedures for data", RP-172416, 7 Dec. 2017.

SUMMARY OF INVENTION

Technical Problem

An aspect of the present invention provides a terminal apparatus capable of efficiently performing uplink transmission, a communication method used for the terminal apparatus, a base station apparatus capable of efficiently performing reception of uplink transmission, and a communication method used for the base station apparatus.

Solution to Problem (1) According to some aspects of the present invention, the following measures are provided. Specifically, a first aspect of the present invention is a terminal apparatus including: a transmitter configured to transmit a UCI payload with CRC bits by using a PUCCH, wherein a size of the CRC bits added to the UCI payload is a first size, and a number of PRBs of a resource of the PUCCH is given based on a second size of the CRC bits.

(2) A second aspect of the present invention is a base station apparatus including: a receiver configured to receive a UCI payload with CRC bits by using a PUCCH, wherein a size of the CRC bits added to the UCI payload is a first size, and a number of PRBs of a resource of the PUCCH is given based on a second size of the CRC bits.

(3) A third aspect of the present invention is a communication method used for a terminal apparatus, the communication method including the step of: transmitting a UCI payload with CRC bits by using a PUCCH, wherein a size of the CRC bits added to the UCI payload is a first size, and a number of PRBs of a resource of the PUCCH is given based on a second size of the CRC bits.

(4) A fourth aspect of the present invention is a communication method used for a base station apparatus, the communication method including the step of: receiving a UCI payload with CRC bits by using a PUCCH, wherein a size of the CRC bits added to the UCI payload is a first size, and a number of PRBs of a resource of the PUCCH is given based on a second size of the CRC bits.

Advantageous Effects of Invention

According to an aspect of the present invention, the terminal apparatus can efficiently perform uplink transmission. The base station apparatus can efficiently perform reception of uplink transmission.

DESCRIPTION OF EMBODIMENTS

Embodiments of the present invention will be described below.

Figure 1:
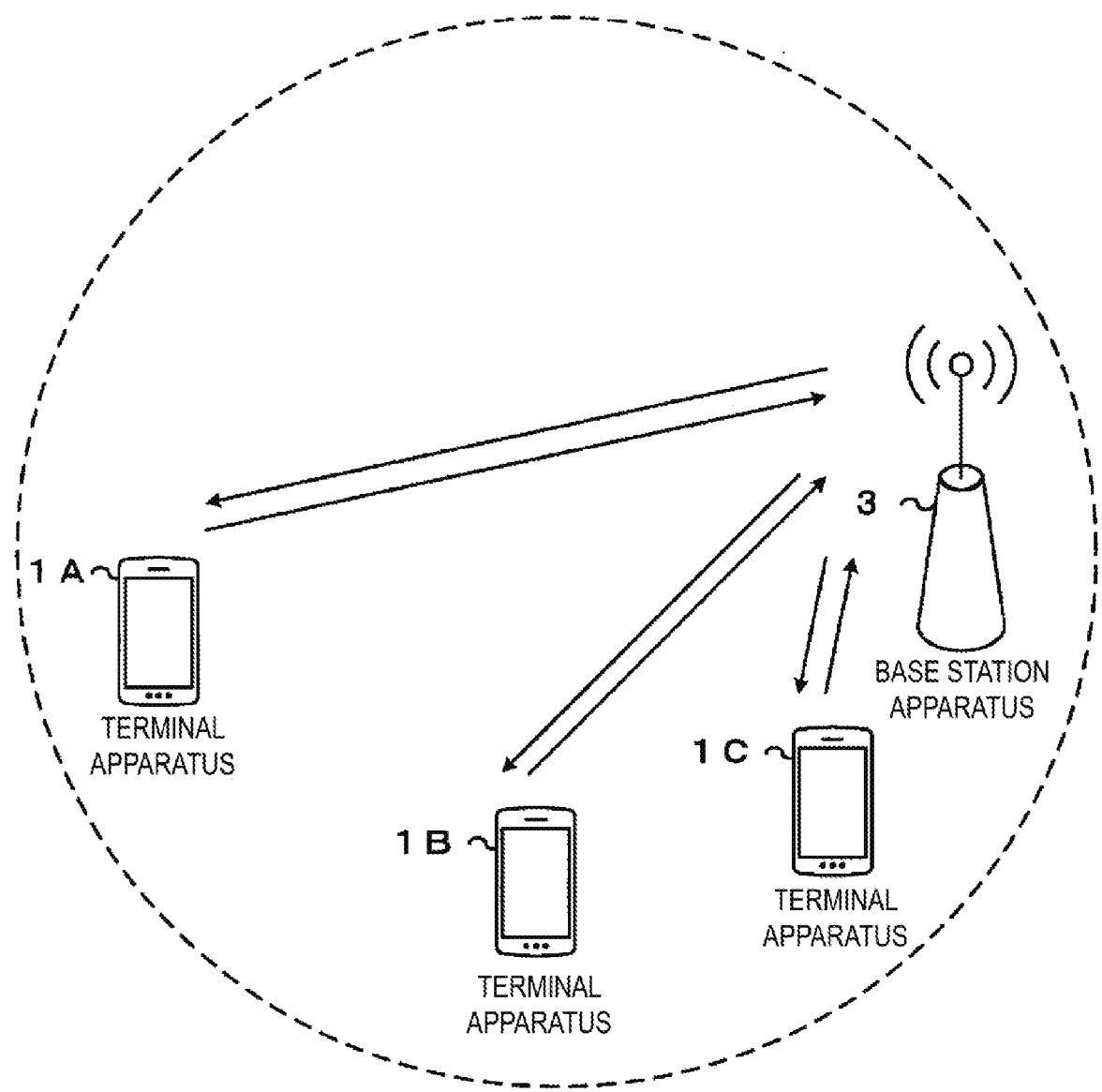
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are referred to as terminal apparatuses 1.

Physical channels and physical signals according to the present embodiment will be described.

In uplink radio communication from a terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used for the terminal apparatus 1 to transmit Uplink Control Information (UCI) to the base station apparatus 3. Note that in the present embodiment, the terminal apparatus 1 may transmit the PUCCH in a primary cell, and/or a secondary cell having functions of a primary cell, and/or a secondary cell capable of transmitting the PUCCH. That is, the PUCCH may be transmitted in a particular serving cell.

The uplink control information includes at least one of downlink Channel State Information (CSI), a Scheduling Request (SR) for indicating a request for a PUSCH resource, and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)).

The HARQ-ACK is also referred to as an ACK/NACK, an HARQ feedback, an HARQ-ACK feedback, an HARQ response, an HARQ-ACK response, HARQ information, HARQ-ACK information, HARQ control information, and HARQ-ACK control information. In a case that downlink data is successfully decoded, an ACK for the downlink data is generated. In a case that downlink data is not successfully decoded, a NACK for the downlink data is generated. Discontinuous transmission (DTX) may mean that downlink data has not been detected. Discontinuous transmission (DTX) may mean that data for which a HARQ-ACK response is to be transmitted has not been detected.

The channel state information may include a Channel Quality Indicator (CQI) and a Rank Indicator (RI). The channel quality indicator may include a Precoder Matrix Indicator (PMI). The channel state information may include a precoder matrix indicator. The CQI is an indicator associated with the channel quality (propagation strength), and the PMI is an indicator for indicating the precoder. The RI is an indicator for indicating the transmission rank (or the number of transmission layers).

The scheduling request includes a positive scheduling request or a negative scheduling request. The positive scheduling request indicates that a UL-SCH resource for initial transmission is requested. The negative scheduling request indicates that a UL-SCH resource for initial transmission is not requested. The terminal apparatus 1 may determine whether or not to transmit a positive scheduling request. The scheduling request being a negative scheduling request may mean that the terminal apparatus 1 determines not to transmit a positive scheduling request.

The PUSCH may be used to transmit uplink data (Transport block, Medium Access Control Protocol Data Unit (MAC PDU), Uplink-Shared Channel (UL-SCH)). The PUSCH may be used to transmit HARQ-ACK and/or channel state information together with uplink data. The PUSCH may be used to transmit only channel state information or only HARQ-ACK and channel state information. In other words, the PUSCH may be used to transmit uplink control information. The terminal apparatus 1 may transmit the PUSCH, based on detection of the Physical Downlink Control Channel (PDCCH) including uplink grant.

The PRACH may be used to transmit a random access preamble (random access message 1). The PRACH may be used to indicate at least some of an initial connection establishment procedure, a handover procedure, a connection re-establishment procedure, synchronization (timing adjustment) for transmission of uplink data, and a request for a PUSCH (UL-SCH) resource.

In uplink radio communication from the terminal apparatus 1 to the base station apparatus 3, the following uplink physical signals may be used. The uplink physical signals may not be used to transmit information output from a higher layer, but are used by a physical layer.

Uplink Reference Signal (UL RS)

According to the present embodiment, at least the following two types of uplink reference signals may be at least used.

Demodulation Reference Signal (DMRS)
Sounding Reference Signal (SRS)

The DMRS is associated with transmission of the PUSCH and/or the PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS may not be associated with transmission of the PUSCH and/or the PUCCH. The SRS may be associated with transmission of the PUSCH and/or the PUCCH. The base station apparatus 3 may use the SRS for measuring a channel state. The SRS may be transmitted in a prescribed number of one or more OFDM symbols from the last in the uplink slot.

The following downlink physical channels may be used for downlink radio communication from the base station apparatus 3 to the terminal apparatuses 1. The downlink physical channels may be used by a physical layer to transmit information output from a higher layer.

Physical Broadcast Channel (PBCH)
Physical Downlink Control Channel (PDCCH)
Physical Downlink Shared Channel (PDSCH)

The PBCH is used to broadcast a Master Information Block (MIB) that is commonly used in one or more terminal apparatuses 1 in a serving cell, or in an active Bandwidth Part (BWP), or in a carrier. The PBCH may be transmitted at a prescribed transmission interval. For example, the PBCH may be transmitted at an interval of 80 ms. At least part of information included in the PBCH may be updated every 80 ms. The PBCH may include a prescribed number of subcarriers (for example, 288 subcarriers) in the frequency domain. The PBCH may include 2, 3, or 4 OFDM symbols in the time domain. The MIB may include information related to an identifier (index) of a synchronization signal. The MIB may include information for indicating at least some of the number of the slot in which the PBCH is transmitted, the number of the subframe in which the PBCH is transmitted, and the number of the radio frame in which the PBCH is transmitted. First configuration information may be included in the MIB. The first configuration information may be configuration information used at least in some or all of the random access message 2, the random access message 3, and the random access message 4.

The PDCCH is used to transmit Downlink Control Information (DCI). The downlink control information is also referred to as DCI format. Note that the DCI format may include one or multiple fields of downlink control information. The downlink control information may include at least one of uplink grant or downlink grant.

The uplink grant may be used for scheduling of a single PUSCH within a single cell. The uplink grant may be used for scheduling of multiple PUSCHs in multiple slots within a single cell. The uplink grant may be used for scheduling a single PUSCH in multiple slots within a single cell. The downlink control information including the uplink grant may be also referred to as DCI format associated with the uplink.

A single downlink grant is at least used for scheduling of a single PDSCH within a single serving cell. The downlink grant is used at least for scheduling of the PDSCH in the same slot as the slot in which the downlink grant is transmitted. The downlink control information including the downlink grant may be also referred to as DCI format associated with the downlink.

The PDSCH is used to transmit downlink data (TB, MAC PDU, DL-SCH, PDSCH, CB, and CBG). The PDSCH is at least used to transmit the random access message 2 (random access response). The PDSCH is at least used to transmit system information including parameters used for initial access.

The BCH, UL-SCH, and DL-SCH described above are transport channels. A channel used in the Medium Access Control (MAC) layer is referred to as a transport channel. A unit of transport channels used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 may exchange (transmit and/or receive) signals in a higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in the RRC layer. The base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are at least used to transmit the RRC signaling and the MAC CE. Here, the RRC signaling transmitted from the base station apparatus 3 on the PDSCH may be RRC signaling common to multiple terminal apparatuses 1 in a cell. The RRC signaling common to the multiple terminal apparatuses 1 in the cell is also referred to as common RRC signaling. The RRC signaling transmitted from the base station apparatus 3 on the PDSCH may be RRC signaling dedicated to a certain terminal apparatus 1 (which is also referred to as dedicated signaling or UE specific signaling). The RRC signaling dedicated to the terminal apparatus 1 is also referred to as dedicated RRC signaling. A cell specific parameter may be transmitted using the RRC signaling common to the multiple terminal apparatuses 1 in the cell or the RRC signaling dedicated to the certain terminal apparatus 1. A UE specific parameter may be transmitted by using the RRC signaling dedicated to the certain terminal apparatus 1.

A configuration of a radio frame according to the present embodiment will be described below.

Figure 2:
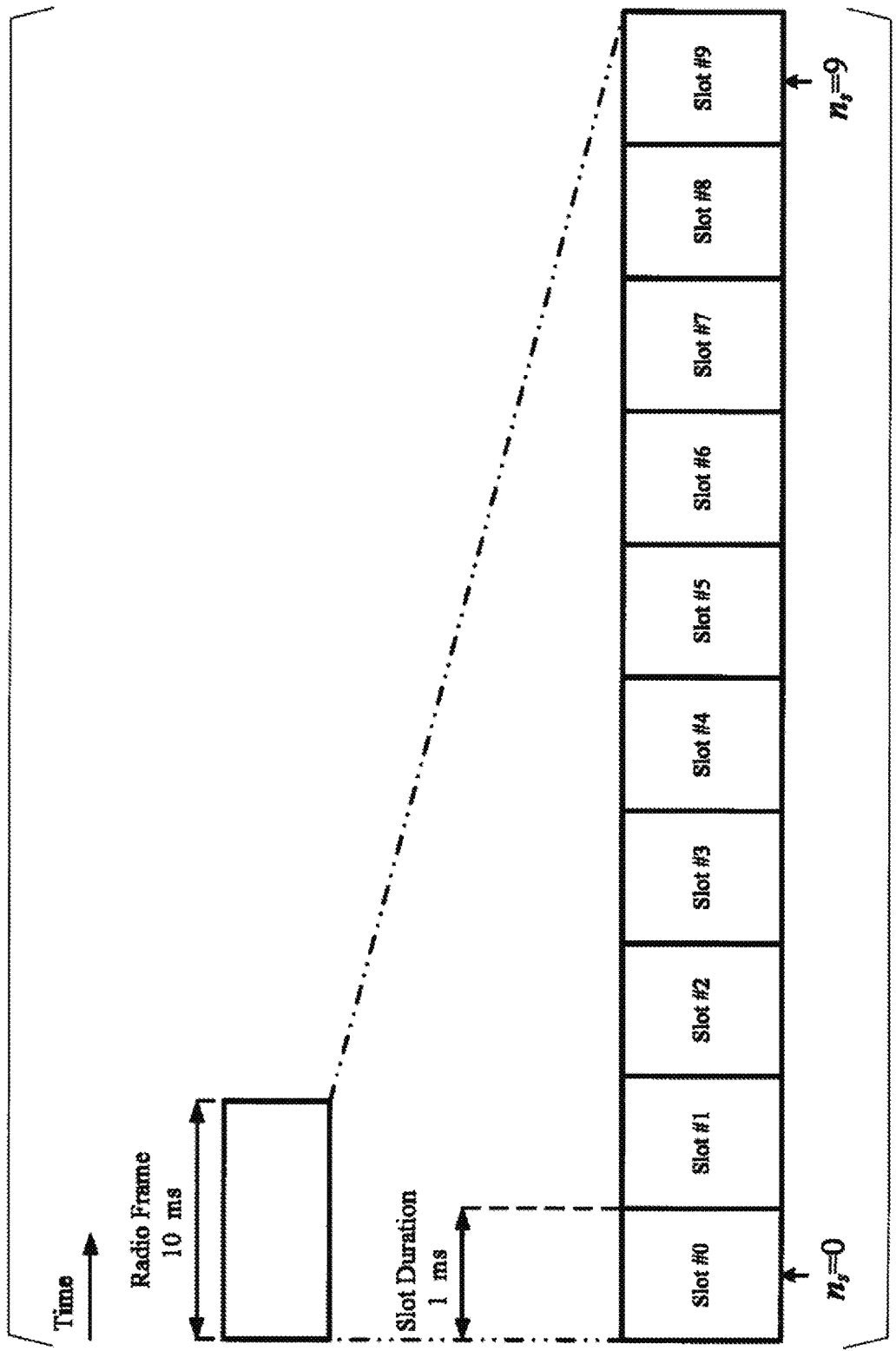
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of radio frames may be 10 ms in length. Each of radio frames may include 10 slots. Each of slots may be 1 ms in length.

Figure 3:
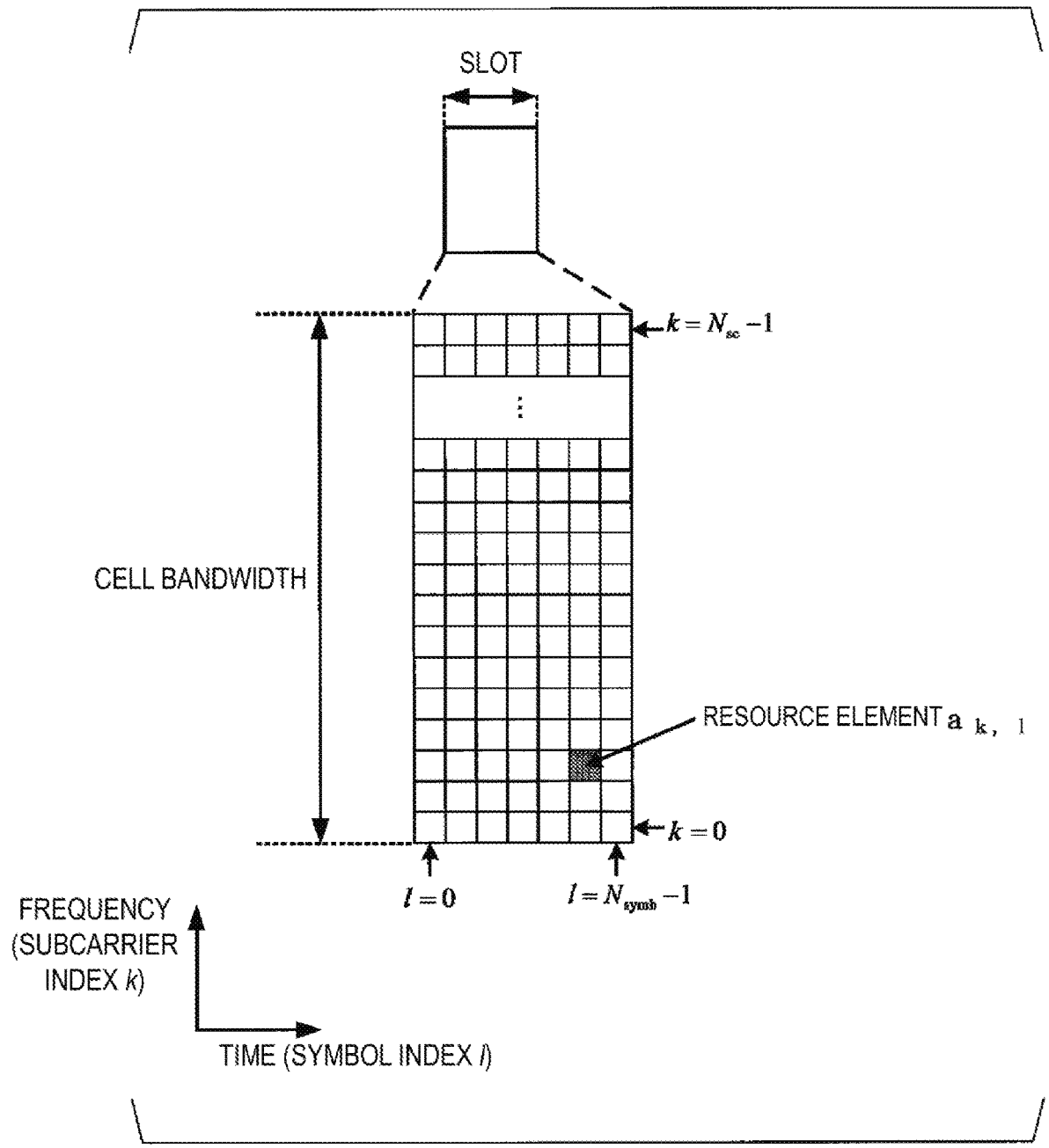
FIG. 3 is a diagram illustrating a schematic configuration of an uplink slot according to the present embodiment.

An example of a configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. The uplink slot may include $N^{UL}_{symb}$ SC-FDMA symbols. The uplink slot may include $N^{UL}_{symb}$ OFDM symbols. In the present embodiment, a case that the uplink slot includes OFDM symbols is described below, but the present embodiment can be also applied to a case that the uplink slot includes SC-FDMA symbols.

In FIG. 3, l is an OFDM symbol number/index, and k is a subcarrier number/index. A physical signal or a physical channel transmitted in each of slots is expressed by a resource grid. In uplink, the resource grid is defined by multiple subcarriers and multiple OFDM symbols. Each element within the resource grid is referred to as a resource element. The resource element is expressed by a subcarrier number/index k and an OFDM symbol number/index l.

The uplink slot may include multiple OFDM symbols l (l=0, 1, . . . , $N^{UL}_{symb}-1$) in the time domain. In one uplink slot, $N^{UL}_{symb}$ may be 7 or 14 for normal Cyclic Prefix (CP) in the uplink. $N^{UL}_{symb}$ may be 6 or 12 for extended Cyclic Prefix (CP) in the uplink.

The terminal apparatus 1 receives a parameter UL-CyclicPrefixLength of a higher layer for indicating the CP length in the uplink from the base station apparatus 3. The base station apparatus 3 may broadcast, in the cell, system information including the parameter UL-CyclicPrefixLength of the higher layer corresponding to the cell.

The uplink slot may include multiple subcarriers k (k=0, 1, . . . , $N^{UL}_{RB}*N^{RB}_{SC}-1$) in the frequency domain. $N^{UL}_{RB}$ is the uplink bandwidth configuration for the serving cell, and is expressed by a multiple of $N^{RB}_{SC}$. $N^{RB}_{SC}$ is the (physical) resource block size in the frequency domain expressed by the number of subcarriers. The subcarrier spacing Δf may be 15 kHz. The $N^{RB}_{SC}$ may be 12. The (physical) resource block size in the frequency domain may be 180 kHz.

One physical resource block is defined by $N^{UL}_{symb}$ continuous OFDM symbols in the time domain and $N^{RB}_{SC}$ continuous subcarriers in the frequency domain. Hence, one physical resource block is constituted by ($N^{UL}_{symb}*N^{RB}_{SC}$) resource elements. One physical resource block may correspond to one slot in the time domain. Physical resource blocks may be numbered $n_{PRB}$ (0, 1, . . . , $N^{UL}_{RB}-1$) in ascending order of frequencies in the frequency domain.

A slot in the downlink according to the present embodiment includes multiple OFDM symbols. Since the configuration of the downlink slot according to the present embodiment is basically the same as the configuration of the uplink slot, the description of the configuration of the downlink slot will be omitted.

Configurations of apparatuses according to the present embodiment will be described below.

Figure 4:
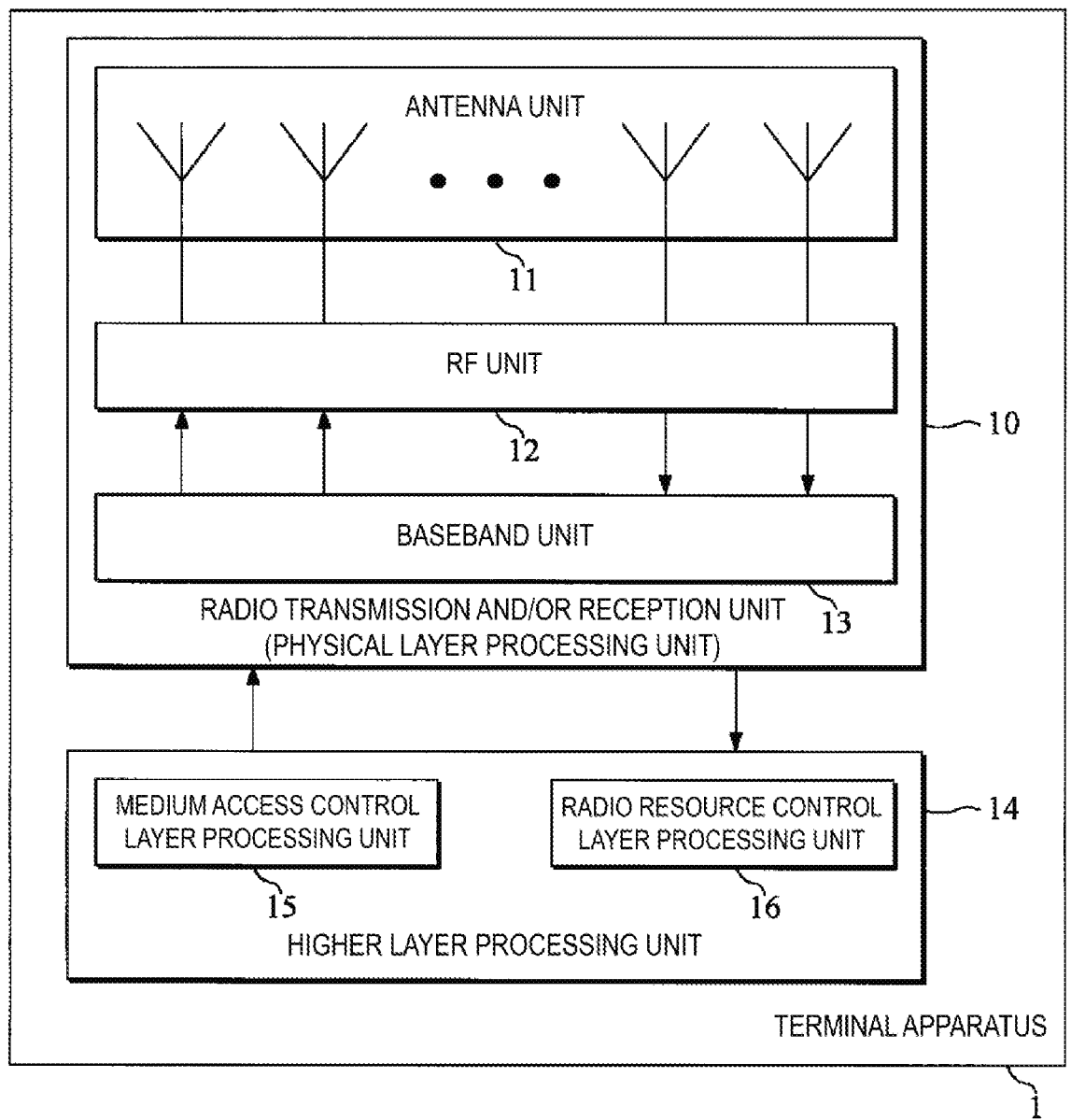
FIG. 4 is a schematic block diagram illustrating a configuration of a terminal apparatus 1 according to the present embodiment.

FIG. 4 is a schematic block diagram illustrating a configuration of a terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls a random access procedure in accordance with various types of configuration information/parameters managed by the radio resource control layer processing unit 16.

The radio resource control layer processing unit 16 included in the higher layer processing unit 14 performs processing of the radio resource control layer. The radio resource control layer processing unit 16 manages various types of configuration information/parameters of the terminal apparatus 1. The radio resource control layer processing unit 16 sets various types of configuration information/parameters, based on higher layer signaling received from the base station apparatus 3. Namely, the radio resource control layer processing unit 16 sets various types of configuration information/parameters in accordance with information for indicating various types of configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes signals received from the base station apparatus 3, and outputs the information resulting from the decoding to the higher layer processing unit 14. The radio transmission and/or reception unit 10 generates transmit signals by modulating and coding data, and performs transmission to the base station apparatus 3.

The RF unit 12 converts (down-converts) signals received via the antenna unit 11 into baseband signals by orthogonal demodulation, and removes unnecessary frequency components. The RF unit 12 outputs processed analog signals to the baseband unit.

The baseband unit 13 converts the analog signals input from the RF unit 12 into digital signals. The baseband unit 13 removes a portion corresponding to Cyclic Prefix (CP) from the digital signals resulting from the conversion, performs Fast Fourier Transform (FFT) for the signals from which CP has been removed, and extracts signals in the frequency domain.

The baseband unit 13 generates SC-FDMA symbols by performing Inverse Fast Fourier Transform (IFFT) of the data, adds CP to the generated SC-FDMA symbols, generates baseband digital signals, and converts the baseband digital signals into analog signals. The baseband unit 13 outputs the analog signals resulting from the conversion, to the RF unit 12.

The RF unit 12 removes unnecessary frequency components from the analog signals input from the baseband unit 13 by using a low-pass filter, up-converts the analog signals into signals of the carrier frequency, and transmits the up-converted signals via the antenna unit 11. The RF unit 12 amplifies power. The RF unit 12 may have a function of controlling transmit power. The RF unit 12 is also referred to as a transmit power control unit.

Figure 5:
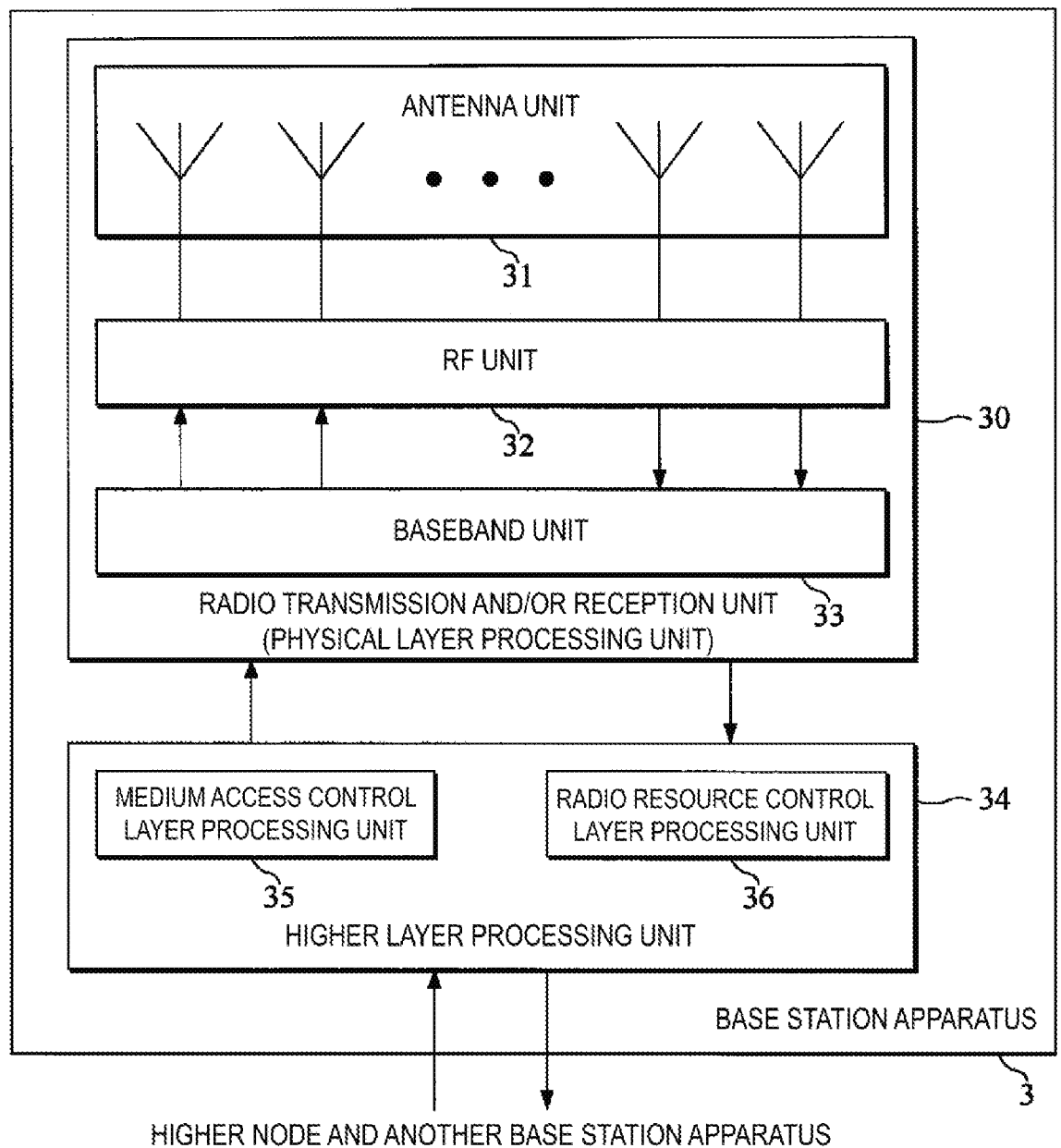
FIG. 5 is a schematic block diagram illustrating a configuration of a base station apparatus 3 according to the present embodiment.

FIG. 5 is a schematic block diagram illustrating a configuration of a base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 controls a random access procedure in accordance with various types of configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units having the reference signs 10 to 16 included in the terminal apparatus 1 may be configured as at least one processor and a memory coupled to the at least one processor.

Each of the units having the reference signs 30 to 36 included in the base station apparatus 3 may be configured as at least one processor and a memory coupled to the at least one processor.

Time Division Duplex (TDD) and/or Frequency Division Duplex (FDD) may be applied to a radio communication system according to the present embodiment. In a case of cell aggregation, serving cells to which TDD is applied and serving cells to which FDD is applied may be aggregated.

Note that the higher layer signaling may be any one of Remaining Minimum System Information (RMSI), Other System Information (OSI), System Information Block (SIB), Radio Resource Control (RRC) message, and Medium Access Control Control Element (MAC CE). Higher layer parameters may refer to parameters or information elements included in higher layer signaling.

The UCI transmitted on the PUCCH may include an HARQ-ACK, a scheduling request, and/or CSI.

The terminal apparatus 1 configures a resource (PUCCH resource) for PUCCH transmission in a PUCCH format, based on one or more higher layer parameters. The higher layer parameter PUCCH-resource-config-PF0 is used to configure one or multiple PUCCH resources for PUCCH transmission in PUCCH format 0. The higher layer parameter PUCCH-resource-config-PF1 is used to configure one or multiple PUCCH resources for PUCCH transmission in PUCCH format 1. The higher layer parameter PUCCH-resource-config-PF2 is used to configure one or multiple PUCCH resources for PUCCH transmission in PUCCH format 2. The higher layer parameter PUCCH-resource-config-PF3 is used to configure one or multiple PUCCH resources for PUCCH transmission in PUCCH format 3. The higher layer parameter PUCCH-resource-config-PF4 is used to configure one or multiple PUCCH resources for PUCCH transmission in PUCCH format 4.

Here, the PUCCH format may be defined based on at least the value or type of the higher layer parameter used for the configuration of the PUCCH resource corresponding to the PUCCH format, and/or the number of UCI bits that can be transmitted with the PUCCH resource corresponding to the PUCCH format. For example, PUCCH format 0 may have a length of one or two OFDM symbols, and the number of UCI bits may be 1 or 2 bits. PUCCH format 1 may have a length equal to or greater than four OFDM symbols, and the number of UCI bits may be 1 or 2 bits. PUCCH format 2 may have a length of one or two OFDM symbols, and the number of UCI bits may be the same as or larger than 3. PUCCH format 3 may have the same as or a longer length than four OFDM symbols, and the number of UCI bits may be the same as or larger than 3. PUCCH format 4 may have the same as or a longer length than four OFDM symbols, and the number of UCI bits may be the same as or larger than 3. The PUCCH resource configured by PUCCH format 4 may include OCC.

The PUCCH resource set may be set to one or multiple by the higher layer parameter PUCCH-resource-set. The terminal apparatus 1 may configure the number of PUCCH resources included in one PUCCH resource set by the higher layer parameter PUCCH-resource-set-size. The terminal apparatus 1 may determine the PUCCH resource set in accordance with the number of UCI bits A. In a case that the number of bits A of the UCI is the same as or smaller than $N_1$, the terminal apparatus 1 determines a first PUCCH resource set. In a case that the number of bits A of the UCI is greater than $N_1$ and is the same as or smaller than $N_2$, the terminal apparatus 1 determines a second PUCCH resource set. In a case that the number of bits A of the UCI is the same as or larger than $N_2$ and is the same as or smaller than $N_3$, the terminal apparatus 1 determines the third PUCCH resource set. In a case that the number of bits A of the UCI is the same as or larger than $N_3$ and is the same as or smaller than $N_4$, the terminal apparatus 1 determines the fourth PUCCH resource set. $N_1$ may be 2. $N_2$, $N_3$, and $N_4$ may be configured by higher layer parameters.

In a case that the terminal apparatus 1 is not configured with the higher layer parameter PUCCH-resource-set for configuring the PUCCH resource set, the uplink BWP for PUCCH transmission with HARQ-ACK information is indicated by SystemInformationBlockType1, and the PUCCH resource set is indicated by the higher layer parameter PUCCH-resource-common included in SystemInformationBlockType1.

In order for the terminal apparatus 1 to transmit HARQ-ACK information by using the PUCCH, the terminal apparatus 1 determines the PUCCH resource after determining the PUCCH resource set. The determination of the PUCCH resource is performed based on at least the value of the PUCCH resource indicator field included in the last DCI format 1_0 or DCI format 1_1 detected by the terminal apparatus 1.

The terminal apparatus 1 transmits, on the PUCCH, HARQ-ACK information corresponding to the order indicated by the detected DCI format 1_0 or DCI format 1_1. The order of the detected DCI format 1_0 or DCI format 1_1 first configures indexes between cells by using the ascending order, and then configures the PDCCH monitoring occasions later. For example, in a case that the terminal apparatus 1 detects the DCI format A in the PDCCH monitoring occasion T and the DCI format B in the PDCCH monitoring occasion (T+1) in the serving cell 1, and detects the DCI format C in the PDCCH monitoring occasion T and the DCI format D in the PDCCH monitoring occasion (T+1) in the serving cell 2, the terminal apparatus 1 transmits, on the PUCCH, the HARQ-ACK information corresponding to each DCI format in the order of the DCI format A, the DCI format C, the DCI format B, and the DCI format D. Here, the DCI format A, the DCI format B, the DCI format C, and the DCI format D may be DCI format of at least any of DCI format 1_0 or DCI format 1_1.

The terminal apparatus 1 maps to the PUCCH resource index configured by the higher layer parameter PUCCH-resource-index indicated by the PUCCH resource indicator field included in DCI format 1_0 or DCI format 1_1 detected from the PDCCH.

The PUCCH resource index is an index of one or more PUCCH resources configured by the higher layer parameter PUCCH-resource-set-size. For example, in a case that four PUCCH resources are configured by the higher layer parameter PUCCH-resource-set-size in a certain PUCCH resource set, the relationship between the value of the PUCCH resource indicator field and the PUCCH resource by the higher layer parameter PUCCH-resource-index is configured such that the PUCCH resource corresponding to the value 00 of the PUCCH resource indicator field is configured with a first PUCCH resource, the PUCCH resource corresponding to the value 01 of the PUCCH resource indicator field is configured with a second PUCCH resource, the PUCCH resource corresponding to the value 10 of the PUCCH resource indicator field is configured with a third PUCCH resource, and the PUCCH resource corresponding to the value 11 of the PUCCH resource indicator field is configured with a fourth PUCCH resource, and the value of the PUCCH resource indicator field included in DCI format 1_0 or DCI format 1-1 detected from the PDCCH by the terminal apparatus 1 is 10, the terminal apparatus 1 selects the third PUCCH resource.

Figure 6:
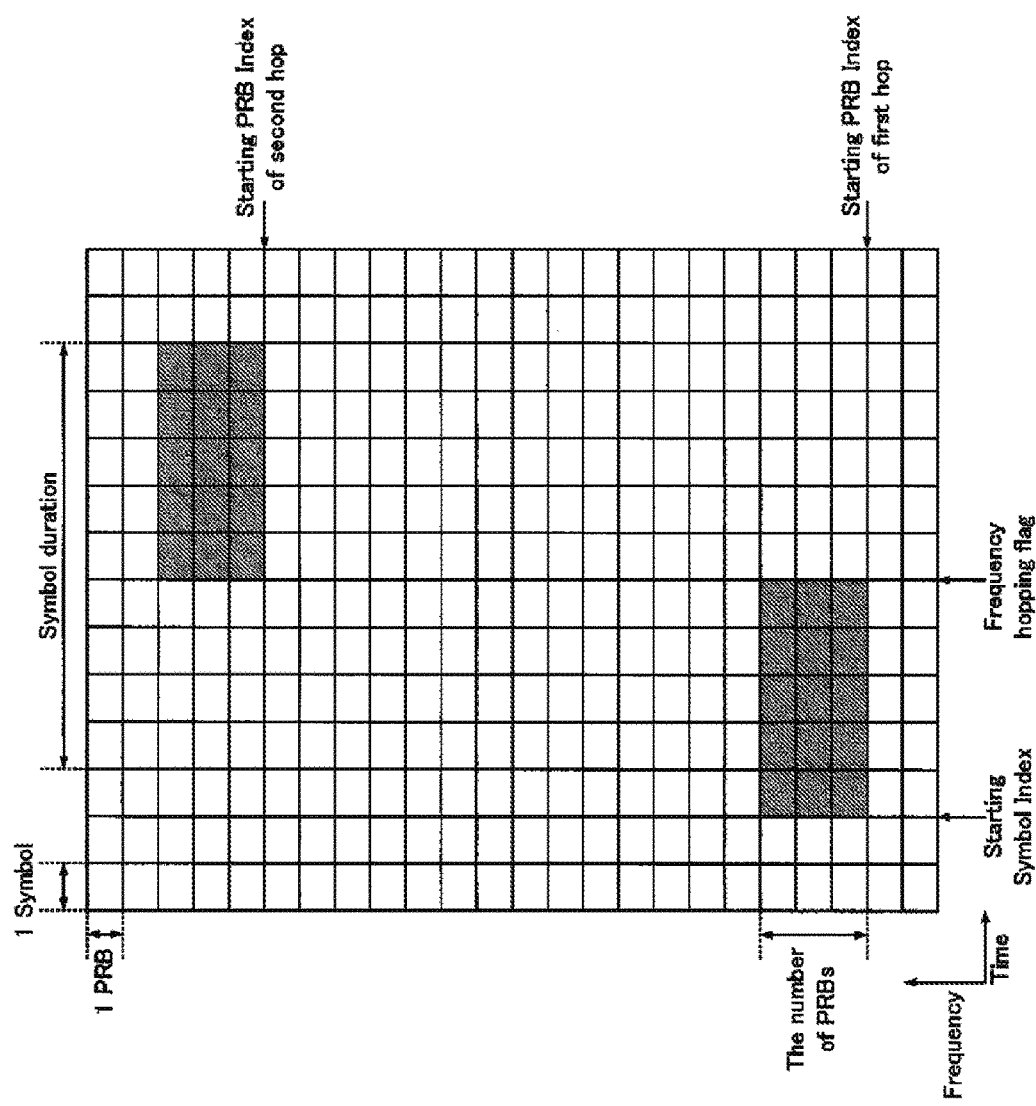
FIG. 6 is a diagram illustrating an example that a PUCCH resource is configured by a higher layer parameter according to the present embodiment.

FIG. 6 is a diagram illustrating an example that a PUCCH resource is configured by a higher layer parameter. One PUCCH resource set may be configured with one or multiple PUCCH resources. As illustrated in FIG. 6, each PUCCH resource is given based on at least some or all of the starting symbol index to which the PUCCH is mapped, the number of symbols (symbol duration), the starting PRB index of first hop in a case without frequency hopping or in a case with frequency hopping, the starting PRB index of second hop in a case with frequency hopping, the number of PRBs, the frequency hopping flag, the index of the cyclic shift, and the index of OCC. Multiple PUCCH resources configured to one PUCCH resource set may be given a small index for a PUCCH resource having a small number of PRBs. In other words, PUCCH resource 1 may have a fewer number or the same number of PRBs than or as PUCCH resource 2. Here, a PRB is also referred to as a bandwidth or an RB.

PUCCH format 0 may be configured based on at least some or all of the starting symbol index, the number of symbols, the frequency hopping flag, the first hop in a case of performing frequency hopping, and/or the starting PRB index in a case of not performing frequency hopping, the starting PRB index of the second hop in the case of performing frequency hopping, and the index of the cyclic shift.

PUCCH format 1 may be configured based on at least some or all of the starting symbol index, the number of symbols, the frequency hopping flag, the first hop in a case of performing frequency hopping, and/or the starting PRB index in a case of not performing frequency hopping, the starting PRB index of the second hop in the case of performing frequency hopping, the index of the cyclic shift, and the index of the OCC.

PUCCH format 2 may be configured based on at least some or all of the starting symbol index, the number of symbols, the frequency hopping flag, the first hop in a case of performing frequency hopping, and/or the starting PRB index in a case of not performing frequency hopping, the starting PRB index of the second hop in the case of performing frequency hopping, and the number of PRBs.

PUCCH format 3 may be configured based on at least some or all of the starting symbol index, the number of symbols, the frequency hopping flag, the first hop in a case of performing frequency hopping, and/or the starting PRB index in a case of not performing frequency hopping, the starting PRB index of the second hop in the case of performing frequency hopping, and the number of PRBs.

PUCCH format 4 may be configured based on at least some or all of the starting symbol index, the number of symbols, the frequency hopping flag, the first hop in a case of performing frequency hopping, and/or the starting PRB index in a case of not performing frequency hopping, the starting PRB index of the second hop in the case of performing frequency hopping, the length of the OCC, and the index of the OCC.

In a case that the PUCCH resource is configured by PUCCH format 0 or PUCCH format 2 in PUCCH transmission, the first symbol index is indicated by the higher layer parameter PUCCH-F0-F2-starting-symbol. In a case that the PUCCH resource is configured by PUCCH format 1, PUCCH format 3, or PUCCH format 4 in PUCCH transmission, the first symbol index is indicated by the higher layer parameter PUCCH-F1-F3-F4-starting-symbol.

In the case that the PUCCH resource is configured by PUCCH format 0 or PUCCH format 2 in PUCCH transmission, the number of symbols is indicated by the higher layer parameter PUCCH-F0-F2-number-of-symbols. In the case that the PUCCH resource is configured by PUCCH format 1, PUCCH format 3, or PUCCH format 4 in PUCCH transmission, the number of symbols is indicated by the higher layer parameter PUCCH-F1-F3-F4-number-of-symbols.

In a case of not performing frequency hopping, the first PRB index of the PUCCH resource used for the PUCCH transmission is indicated by the higher layer parameter PUCCH-starting-PRB. In a case of a PUCCH resource that performs frequency hopping, the first PRB index of the PUCCH resource used for the PUCCH transmission in the first hopping is indicated by the higher layer parameter PUCCH-starting-PRB. In a case of a PUCCH resource that performs frequency hopping, the first PRB index of the PUCCH resource used for the PUCCH transmission in the second hopping is indicated by the higher layer parameter PUCCH-2nd-hop-PRB.

In a case that the terminal apparatus 1 transmits the PUCCH by using PUCCH format 2, the number of PRBs used for the PUCCH transmission is indicated by the higher layer parameter PUCCH-F2-number-of-PRBs. In a case that the terminal apparatus 1 transmits the PUCCH by using PUCCH format 3, the number of PRBs used for the PUCCH transmission is indicated by the higher layer parameter PUCCH-F3-number-of-PRBs.

Whether or not the terminal apparatus 1 performs frequency hopping of the PUCCH resource is indicated by the higher layer parameter PUCCH-frequency-hopping.

In a case that the terminal apparatus 1 transmits the PUCCH by using PUCCH format 0 and/or PUCCH format 1, the index of the cyclic shift of the PUCCH resource is indicated by the higher layer parameter PUCCH-F0-F1-initial-cyclic-shift.

In a case that the terminal apparatus 1 transmits the PUCCH by using PUCCH format 1, one or multiple values used in generating the Orthogonal Cover Code (OCC) is given based on at least the number of symbols of the PUCCH and the higher layer parameter PUCCH-F1-time-domain-OCC.

In a case that the terminal apparatus 1 transmits the PUCCH by using PUCCH format 4, one or multiple values used in generating the Orthogonal Cover Code (OCC) is given based on at least the number of symbols of the PUCCH and the higher layer parameter PUCCH-F1-time-domain-OCC.

In PUCCH format 3, the terminal apparatus 1 may be configured with the number of DMRSs used for the DMRS transmission by the higher layer parameter PUCCH-F3-F4-additional-DMRS. In PUCCH format 4, the terminal apparatus 1 may be configured with the number of DMRSs used for the DMRS transmission by the higher layer parameter PUCCH-F3-F4-additional-DMRS.

Figure 8:
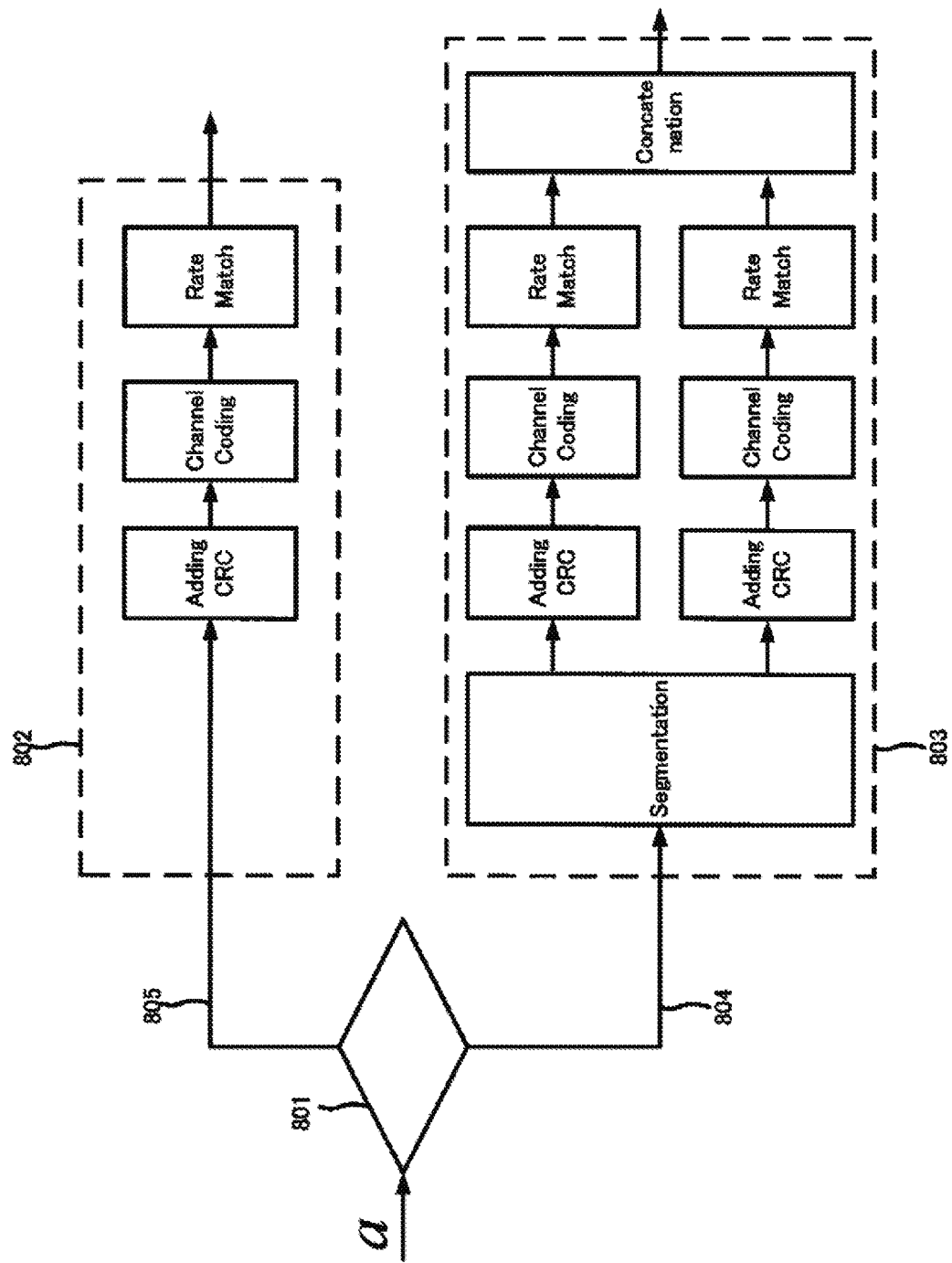
FIG. 8 is a diagram illustrating code block segmentation based on the size of a UCI payload a and the size of a rate matching output sequence $f^c_e$ according to the present embodiment.

In a case that the terminal apparatus 1 transmits HARQ-ACK information and the CRC bits for the HARQ-ACK information by PUCCH format 2, as illustrated in block 802 in FIG. 8, the terminal apparatus 1 determines the minimum number of PRBs of the PUCCH resource configured by the higher layer parameter such that the coding rate of the codeword after encoding the HARQ information and the CRC bits is the same as or lower than the coding rate given by the higher layer parameter PUCCH-F3-maximum-coderate. The minimum number of PRBs is given based on at least the number of HARQ-ACK information bits, the number of CRC bits for the HARQ-ACK information, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

In a case that the terminal apparatus 1 transmits HARQ-ACK information and the CRC bits for the HARQ-ACK information by PUCCH format 3, as illustrated in block 802 in FIG. 8, the terminal apparatus 1 determines the minimum number of PRBs of the PUCCH resource configured by the higher layer parameter such that the coding rate of the codeword after encoding the HARQ-ACK information and the CRC bits is the same as or lower than the coding rate given by the higher layer parameter PUCCH-F3-maximum-coderate. The minimum number of PRBs is given based on at least the number of HARQ-ACK information bits, the number of CRC bits for the HARQ-ACK information, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

In a case that the terminal apparatus 1 transmits HARQ-ACK information and the CRC bits for the HARQ-ACK information by PUCCH format 2, the UCI payload is the same as or larger than 360 bits, and the output of the rate matching is the same as or greater than 1088 bits, as illustrated in block 803 in FIG. 8, the terminal apparatus 1 performs Code block segmentation on the HARQ-ACK information, and adds CRC bits to each of information bits after code block segmentation (also referred to as code block). The terminal apparatus 1 determines the minimum number of PRBs of the PUCCH resource configured by the higher layer parameter such that the coding rate of the codeword after encoding the HARQ information and the CRC bits is the same as or lower than the coding rate given by the higher layer parameter PUCCH-F2-maximum-coderate. The minimum number of PRBs is given based on at least the number of HARQ-ACK information bits, the number of CRC bits for the HARQ-ACK information, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

In a case that the terminal apparatus 1 transmits HARQ-ACK information and the CRC bits for the HARQ-ACK information by PUCCH format 3, the UCI payload is the same as or larger than 360 bits, and the output of the rate matching is the same as or greater than 1088 bits, as illustrated in block 803 in FIG. 8, the terminal apparatus 1 performs code block segmentation on the HARQ-ACK information, and adds CRC bits to each of information bits after code block segmentation (also referred to as code block). The terminal apparatus 1 determines the minimum number of PRBs of the PUCCH resource configured by the higher layer parameter such that the coding rate of the codeword after encoding the HARQ information and the CRC bits is the same as or lower than the coding rate given by the higher layer parameter PUCCH-F3-maximum-coderate. The minimum number of PRBs is given based on at least the number of HARQ-ACK information bits, the number of CRC bits for the HARQ-ACK information, the number of subcarriers per 1 PRB, the number of bits corresponding to the modulation scheme, and/or the maximum coding rate. The number of bits corresponding to the modulation scheme may be 1 in a case of pi/2-BPSK. The number of bits corresponding to the modulation scheme may be 2 in a case of QPSK.

The codeword may be a sequence including at least coded bits of the UCI. The codeword may be a sequence mapped to a PRB. The codeword may be a sequence given based on at least the concatenation of one or more rate matching output sequences. The one or multiple rate matching output sequences $f^c_e$ may be given based on at least the rate matching processing of the coding sequence $d^c_n$ of the UCI. Here, c is an index for indicating a code block number. c is an index for indicating a value from 0 to C−1. C denotes the number of code blocks. e denotes any integer ranging from 0 to E−1. E denotes the size of the rate matching output sequence $f^c_e$. n denotes any integer ranging from 0 to N−1. N may be the number of coded bits of the UCI of the c-th code block. N denotes the size of the coding sequence $d^c_n$ of the UCI. The input of the rate matching processing may be the coding sequence $d^c_n$ of the UCI.

The rate matching output sequence $f^c_e$ may be $f^c_e = d^c_{mod(n,\ N)}$. Here, mod (X, Y) may be a function that outputs the remainder of the case that X is divided by Y. The rate matching output sequence $f^c_e$ may be $f^c_e = d^c_{mod\ (n,\ N)}$ at least in a case that a polar code is used for channel coding and E is equal to or greater than N. The coding sequence $d^c_n$ of the UCI may be given by interleaving the coding sequence after channel coding.

The number of code blocks C is given based on code block segmentation. Details of the code block segmentation will be described below.

In a case that the number of code blocks C is 1, code block concatenation may not be performed.

The UCI may include at least CRC bits given based on at least the HARQ-ACK, the SR, and CSI.

In a case that the size A of the payload a of the UCI is less than 12, CRC bits of the size L1 are added. In a case that the size A of the UCI payload a is the same as or larger than 12 and is the same as or smaller than 19, CRC bits of the size L2 are added. In a case that the size A of the UCI payload a is the same as or larger than 20, CRC bits of the size L3 are added. Here, L1 may be 0. L2 may be 6. L3 may be 11.

FIG. 8 is a diagram illustrating code block segmentation based on the size of the UCI payload a and the size of the rate matching output sequence $f^c_e$. The size A of the UCI payload a and the size of the CRC bits corresponding to the UCI payload a are referred to as the total payload. Alternatively, the UCI payload a and the payload including the CRC bits added to the UCI payload a are referred to as the total payload.

The terminal apparatus 1 determines, at 801, whether or not to perform code block segmentation, based on at least the size A of the UCI payload a, the threshold value $K_1$ for the size A of the UCI payload a, the size E of the rate matching output sequence $f^c_e$ of the total payload, and the threshold $E_1$ for the size E of the rate matching output sequence $f^c_e$. Note that the size of the CRC bits added to the UCI payload may be determined based on the size of the UCI payload.

(804) In a case that the size A of the UCI payload a is equal to or greater than $K_1$, and the size E of the rate matching output sequence $f^c_e$ is equal to or greater than $E_1$, the terminal apparatus 1 can divide the UCI payload a into two at block 803 (the number of code blocks C=2). Here, $K_1$ may be 360. $E_1$ may be 1088. The rate matching output sequence $f^c_e$ is given based on at least channel coding and rate matching processing of the total payload that includes at least the UCI payload.

(805) In a case that the size A of the UCI payload a is at least less than $K_1$, or the size E of the rate matching output sequence $f^c_e$ is at least less than $E_1$, CRC bits are added to the UCI payload a in block 802 to perform channel coding. That is, in a case that the size A of the UCI payload a is at least less than $K_1$, or the size E of the rate matching output sequence Fe is at least less than $E_1$, code block segmentation may not be performed on the total payload (or the number of code blocks C may be C=1). Note that the total payload may be a payload with CRC bits added to the UCI payload a. That is, the size of the total payload may be determined based on the size of the UCI payload a and the size of the CRC bits added to the UCI payload a.

Figure 9:
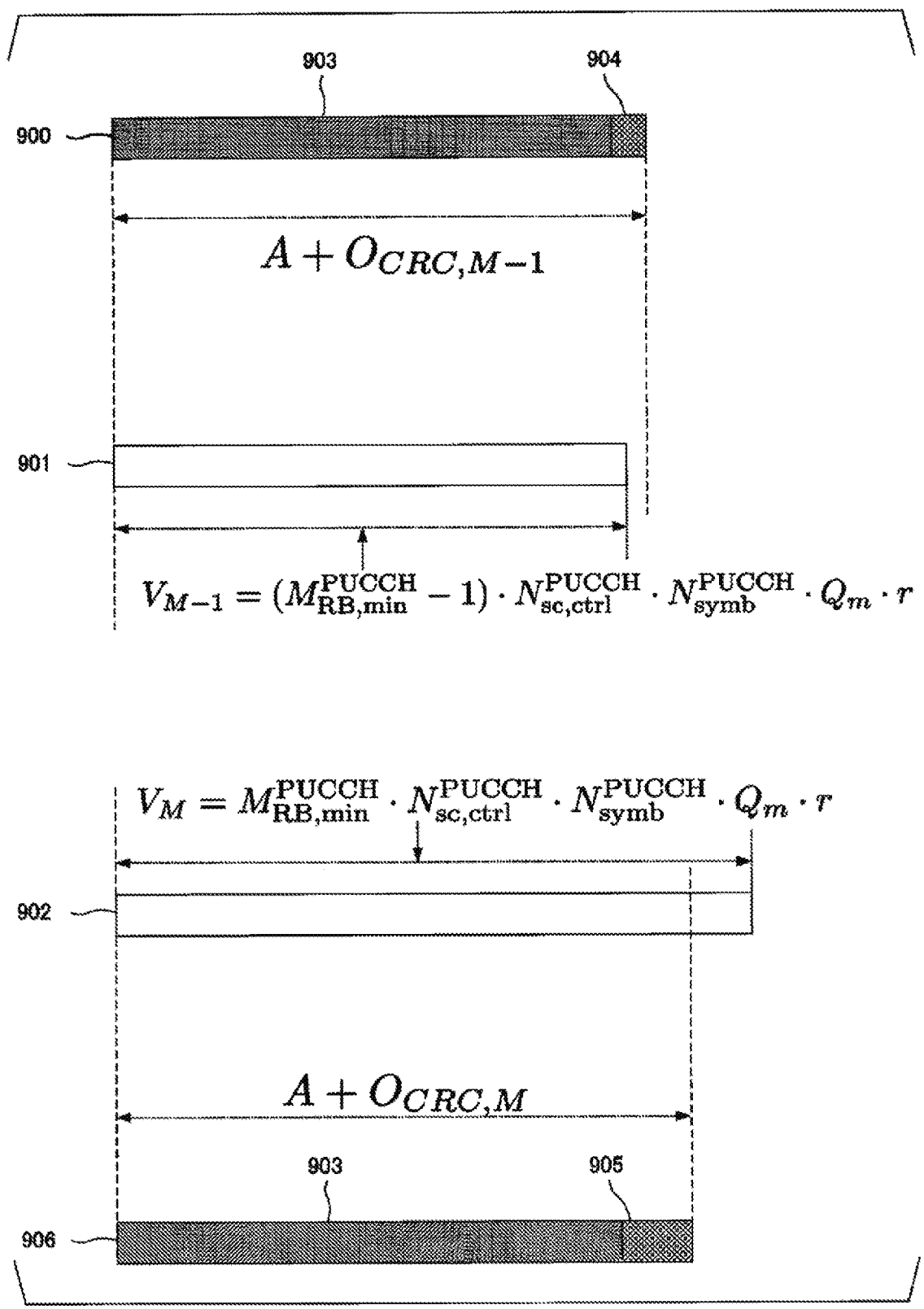
FIG. 9 is a diagram illustrating an example of a method for determining the number of PRBs of a PUCCH resource according to the present embodiment.

FIG. 9 is a diagram illustrating an example of a method for determining the number of PRBs of a PUCCH resource. The terminal apparatus 1 sets the number of PRBs of the PUCCH resource to $M_{RB,min}^{PUCCH}$. Here, $M_{RB,min}^{PUCCH}$ may be the minimum number of PRBs that satisfies the condition that $M_{RB,min}^{PUCCH}$ is the same as or smaller than the number of PRBs indicated by the higher layer parameter PUCCH-F2-number-of-PRBs or PUCCH-F3-number-of-PRBs for PUCCH transmission. For PUCCH format 2, $M_{RB,min}^{PUCCH}$ may be the minimum number of PRBs that satisfies the condition that $M_{RB,min}^{PUCCH}$ is the same as or smaller than the number of PRBs indicated by the higher layer parameter PUCCH-F2-number-of-PRBs for PUCCH transmission. For PUCCH format 3, $M_{RB,min}^{PUCCH}$ may be the minimum number of PRBs that satisfies the condition that $M_{RB,min}^{PUCCH}$ is the same as or smaller than the number of PRBs indicated by the higher layer parameter PUCCH-F3-number-of-PRBs for PUCCH transmission. The terminal apparatus 1 sets the minimum number of PRBs that satisfies Inequality 1 expressed by Formula 1 and Inequality 2 expressed by Formula 2 to $M_{RB,min}^{PUCCH}$. The number of PRBs of the PUCCH resource that maps the rate matching output sequence $f^c_e$ of the total payload ($M_{RB,min}^{PUCCH}$) may be the same or less than the number of PRBs indicated by a higher layer parameter. The number of PRBs ($M_{RB,min}^{PUCCH}-1$) may mean one PRB less than the number of PRBs ($M_{RB,min}^{PUCCH}$).

$$A + O_{CRC,M-1} > V_{M-1} \quad \text{Formula 1}$$

$$A + O_{CRC,M} \leq V_M \quad \text{Formula 2}$$

In FIG. 9, 900 is the total payload assumed in a case that the number of PRBs of the PUCCH resource is set to $M_{RB,min}^{PUCCH}-1$. 900 may include 903 and 904. 903 may be the UCI payload. 904 is CRC bits added to 903. The number of 904 (number of bits, bit size, size) $O_{CRC,M-1}$ may be given by assuming that the number of PRBs of the PUCCH resource is set to $M_{RB,min}^{PUCCH}-1$. The number of 904 $O_{CRC,M-1}$ may be determined based on E given by Equation 3. Here, E used to calculate the number $O_{CRC,M-1}$ of the CRC bits 904 added to 903 may be different from the actual E. That is, the number $O_{CRC,M-1}$ of the CRC bits 904 added to 903 may be calculated based on a value of a virtual E. In other words, the number of the CRC bits 904 may be the same as or different from the actual number of CRC bits. The number $O_{CRC,M-1}$ of the CRC bits 904 added to 903 may be determined based on the flowchart of FIG. 7 in accordance with E given by Formula 1.

The number $O_{CRC,M-1}$ of the CRC bits 904 added to 903 in FIG. 9 may be given by assuming the number of PRBs indicated by PUCCH-F2-number-of-PRBs or PUCCH-F3-number-of-PRBs. The number $O_{CRC,M-1}$ of the CRC bits 904 added to 903 may be given based on a first higher layer parameter.

$N_{sc,ctrl}^{RB}$ may be given by the PUCCH format. $N_{sc,ctrl}^{RB}$ may be the number of subcarriers given to one PRB. $N_{sc,ctrl}^{RB}$ may be the number of subcarriers excluding subcarriers given by DMRS. $N_{sc,ctrl}^{RB}$ may be the number of subcarriers included in one PRB in the frequency domain and not mapped to the DMRS. $Q_m$ may be the modulation order. $Q_m$ may be a number in accordance with the modulation scheme. $Q_m$ may be the number of bits that can be transmitted at one modulation symbol. In the case of pi/2-BPSK, $Q_m$ may be 1. In the case of QPSK, $Q_m$ may be 2. r is a code rate to be given by a higher layer parameter. In the case of PUCCH format 2, the code rate r is given by the higher layer parameter PUCCH-F2-maximum-coderate. In the case of PUCCH format 3, the code rate r is given by the higher layer parameter PUCCH-F3-maximum-coderate. In the case of PUCCH format 4, the code rate r is given by the higher layer parameter PUCCH-F4-maximum-coderate. $N_{symb}^{PUCCH}$ is the number of symbols in PUCCH format 2, and/or PUCCH format 3, and/or PUCCH format 4. In PUCCH format 2, $N_{symb}^{PUCCH}$ may be given by the higher layer parameter PUCCH-F0-F2-number-of-symbols. In PUCCH format 3 and/or PUCCH format 4, $N_{symb}^{PUCCH}$ is the number of symbols excluding the number of symbols used for transmission of the DMRS, and may be determined by the higher layer parameter PUCCH-F1-F3-number-of-symbols.

In FIG. 9, $V_{M-1}$ in 901 is given by Equation 4. As illustrated by Inequality 1 in Formula 1, the terminal apparatus 1 sets $M_{RB,min}^{PUCCH}$ such that the total payload 900 is greater than $V_{M-1}$ given by Equation 4. The total payload 900 being greater than $V_{M-1}$ given by Equation 4 may mean that the code rate $R_{M-1}$ of the total payload assumed in a case that the number of PRBs of the PUCCH resource is set to $M_{RB,min}^{PUCCH}-1$ is greater than the code rate r. Here, the code rate $R_{M-1}$ of the total payload may be given by assuming that the number of PRBs of the PUCCH resource is set to $M_{RB,min}^{PUCCH}-1$. The code rate $R_{M-1}$ of the total payload may be given by Equation 5.

$$E = (M_{RB,min}^{PUCCH}-1) \cdot N_{sc,ctrl}^{PUCCH} \cdot N_{symb}^{PUCCH} \cdot Q_m \quad \text{Equation 3}$$

$$V_{M-1} = (M_{RB,min}^{PUCCH}-1) \cdot N_{sc,ctrl}^{PUCCH} \cdot N_{symb}^{PUCCH} \cdot Q_m \cdot r \quad \text{Equation 4}$$

$$V_{M-1} = (M_{RB,min}^{PUCCH}-1) \cdot N_{sc,ctrl}^{PUCCH} \cdot N_{symb}^{PUCCH} \cdot Q_m \cdot r \quad \text{Equation 5}$$

In FIG. 9, 906 is the total payload in a case that the number of PRBs of the PUCCH resource is set to $M_{RB,min}^{PUCCH}$. 903 may be the UCI payload. 905 is CRC bits added to 903. The number $O_{CRC,M}$ of 905 in a case that the number of PRBs of the PUCCH resource is set to $M_{RB,min}^{PUCCH}$ may be determined based on E given by Equation 5. Here, E used to calculate the number of CRC bits 905 added to 903 may be different from E derived by Equation 3. E used to calculate the number of CRC bits 905 added to 903 may be the same as the actual E. That is, the number of CRC bits 905 added to 903 may be calculated based on the same value as the actual value of E. In other words, the number of CRC bits 905 may be the actual number of CRC bits. The number of CRC bits 905 added to 903 may be determined based on the flowchart of FIG. 7 in accordance with E given by Equation 4.

The number $O_{CRC,M}$ of the CRC bits 905 added to 903 in FIG. 9 may be given by assuming the number of PRBs indicated by PUCCH-F2-number-of-PRBs or PUCCH-F3- number-of-PRBs. The number $O_{CRC,M}$ of the CRC bits 905 added to 903 may be given based on a first higher layer parameter. The number $O_{CRC,M}$ of the CRC bits 905 added to 903 may be given based on a second higher layer parameter.

In FIG. 9, $V_M$ in 902 is given by Equation 7. As illustrated by Inequality 2 in Formula 2, the terminal apparatus 1 sets $M_{RB,min}^{PUCCH}$ such that the total payload 906 is the same as or smaller than $V_M$ given by Equation 7. The total payload 906 being the same as or smaller than $V_M$ given by Equation 7 may mean that the code rate $R_M$ of the total payload in a case that the number of PRBs of the PUCCH resource is set to $M_{RB,min}^{PUCCH}$ is the same or less than the code rate r. Here, the code rate $R_M$ of the total payload may be given the number of PRBs of the PUCCH resource, based on $M_{RB,min}^{PUCCH}$. The code rate $R_M$ of the total payload may be given by Equation 8.

$$E = M_{RB,min}^{PUCCH} \cdot N_{sc,ctrl}^{PUCCH} \cdot N_{symb}^{PUCCH} \cdot Q_m \quad \text{Equation 6}$$

$$E = M_{RB,min}^{PUCCH} \cdot N_{sc,ctrl}^{PUCCH} \cdot N_{symb}^{PUCCH} \cdot Q_m \quad \text{Equation 7}$$

$$R_M = \frac{A + O_{CRC,M}}{M_{RB,min}^{PUCCH} \cdot N_{sc,ctrl}^{PUCCH} \cdot N_{symb}^{PUCCH} \cdot Q_m} \quad \text{Equation 8}$$

Figure 7:
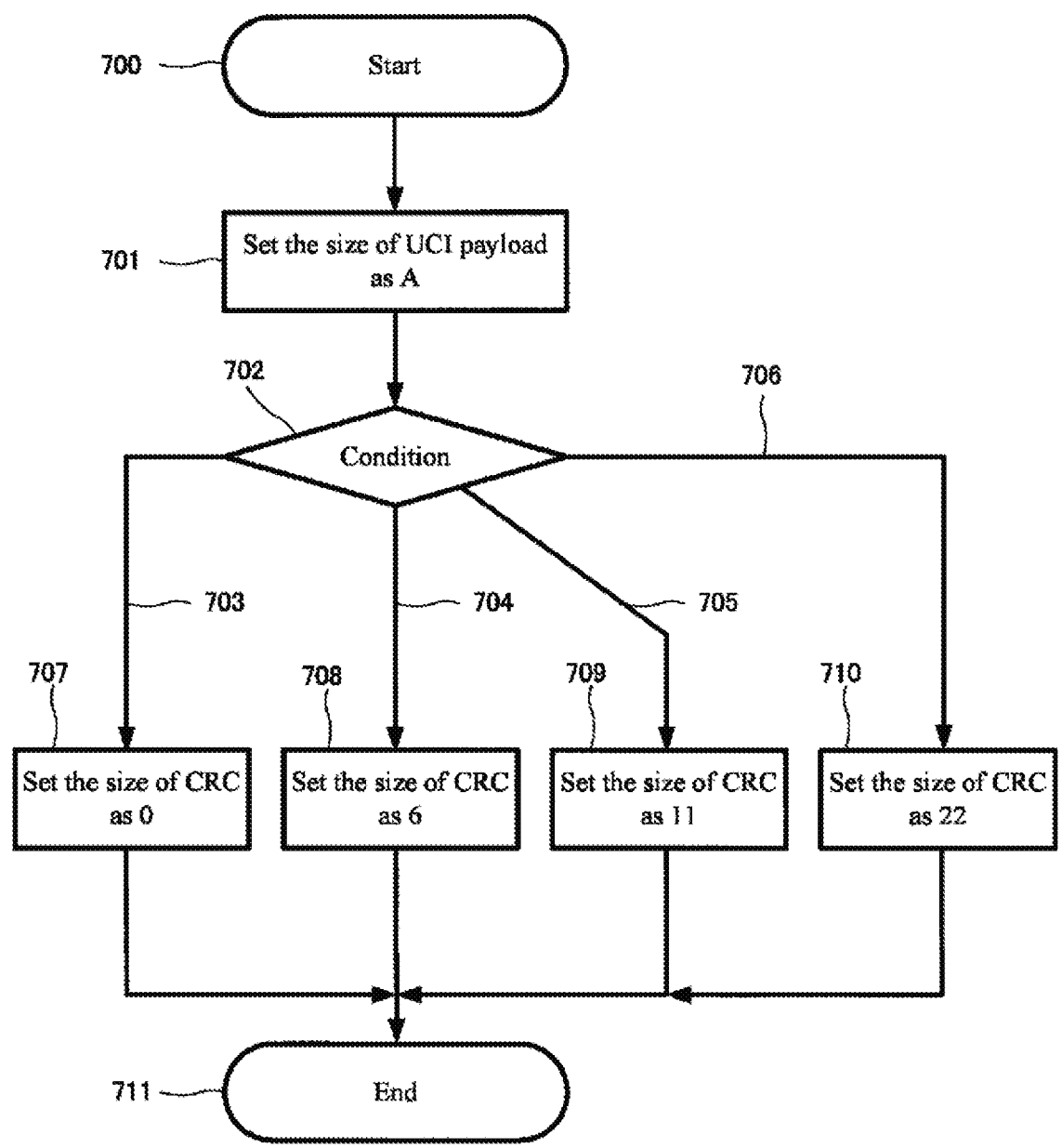
FIG. 7 is a diagram illustrating a flowchart for determining the size of CRC bits according to the present embodiment.

FIG. 7 is a diagram illustrating a flowchart for determining the size of CRC bits. In (701), the terminal apparatus 1 sets the size of the UCI payload to A. In (702), the terminal apparatus 1 determines the size of the CRC bits added to the UCI payload, based on at least one of the size A of the UCI payload, and E given by Equation 3 and/or Equation 6. Here, for example, in a case that A is less than 12, the process proceeds to (703). For example, in a case that A is the same as or greater than 12 and A is less than 20, the process proceeds to (704). For example, in a case that A is the same as or greater than 20 and A is less than 360, the process proceeds to (705). For example, in a case that A is the same as or greater than 360 and E is the same as or greater than 1088, the process proceeds to (706). In other words, in a case that each of A and/or E satisfies a prescribed condition, the process proceeds to any one of (703) to (706).

(707) The terminal apparatus 1 configures the size of the CRC bits added to the UCI payload to 0.

(708) The terminal apparatus 1 configures the size of the CRC bits added to the UCI payload to 6.

(709) The terminal apparatus 1 configures the size of the CRC bits added to the UCI payload to 11. Note that the value of E may be less than 1088.

(710) The terminal apparatus 1 configures the size of the CRC bits added to the UCI payload to 22.

Note that in (703) and/or (704), the terminal apparatus 1 may not consider the value of E given from Equation 3 and/or Equation 6.

Note that in (705) and (706), the value of E may be given by Equation 3 or Equation 6. In a case that the size $O_{CRC,M-1}$ of CRC bits 904 is calculated based on the flowchart in FIG. 7, E in (705) and (706) may be given by Equation 3. In a case that the size $O_{CRC,M}$ of CRC bits 905 is calculated based on the flowchart in FIG. 7, E in (705) and (706) may be given by Equation 6.

The CRC added to the UCI payload is referred to as CRC bits. Temporary CRC bits referenced to select the number of PRBs $M_{RB,min}^{PUCCH}$ of the PUCCH resource is referred to as virtual CRC bits. The size of the CRC bits referenced to select the number of PRBs $M_{RB,min}^{PUCCH}$ of the PUCCH resource is referred to as the size of temporary CRC bits or the size of virtual CRC bits. The size of the virtual CRC bits may be the same as or different from the size of the CRC bits added to the UCI payload. The UCI payload may be the same as the UCI payload a.

The size of the virtual CRC bits may be the number of 904 $O_{CRC,M}$, and/or the number of 905 $O_{CRC,M-1}$. The number of 904 $O_{CRC,M}$, and/or the number of 905 $O_{CRC,M-1}$ used to select the number of PRBs $M_{RB,min}^{PUCCH}$ of the PUCCH resource may be given by the size of the virtual CRC bits.

The size of the virtual CRC bits may be given based at least on the size of the UCI payload a. The size of the virtual CRC bits may be given based at least on the number of bits of the HARQ-ACK information. The size of the virtual CRC bits may be given based at least on the number of bits of the scheduling request. The size of the virtual CRC bits may be given based at least on the number of bits of the CSI. The size of the virtual CRC bits may be given based at least on the number of bits of the HARQ-ACK information, the number of bits of the scheduling request, the number of bits of the CSI, and the sum of any combinations. The size of the virtual CRC bits may be given regardless of the size of the UCI payload a. Here, the size of the CRC bits added to the UCI payload a may be given based on at least the size of the UCI payload a. The size of the virtual CRC bits may be a prescribed value regardless of the size of the UCI payload a. For example, the prescribed value may be 0. The prescribed value may be 6. The prescribed value may be 11.

The CSI may be divided into one or multiple pieces. For example, in a case that the CSI is divided into two, the divided first CSI may be CSI-part1, and the divided second CSI may be CSI-part2. The CSI may be a portion of the number of bits of the divided CSI. The CSI may be the number of bits of the CSI-part1. The CSI may be the number of bits of the CSI-part2. The CSI may be the sum of the number of bits of the multiple divided pieces of CSI. The sum of the number of bits of the multiple divided pieces of CSI is the number of bits of the CSI before being divided.

Figure 10:
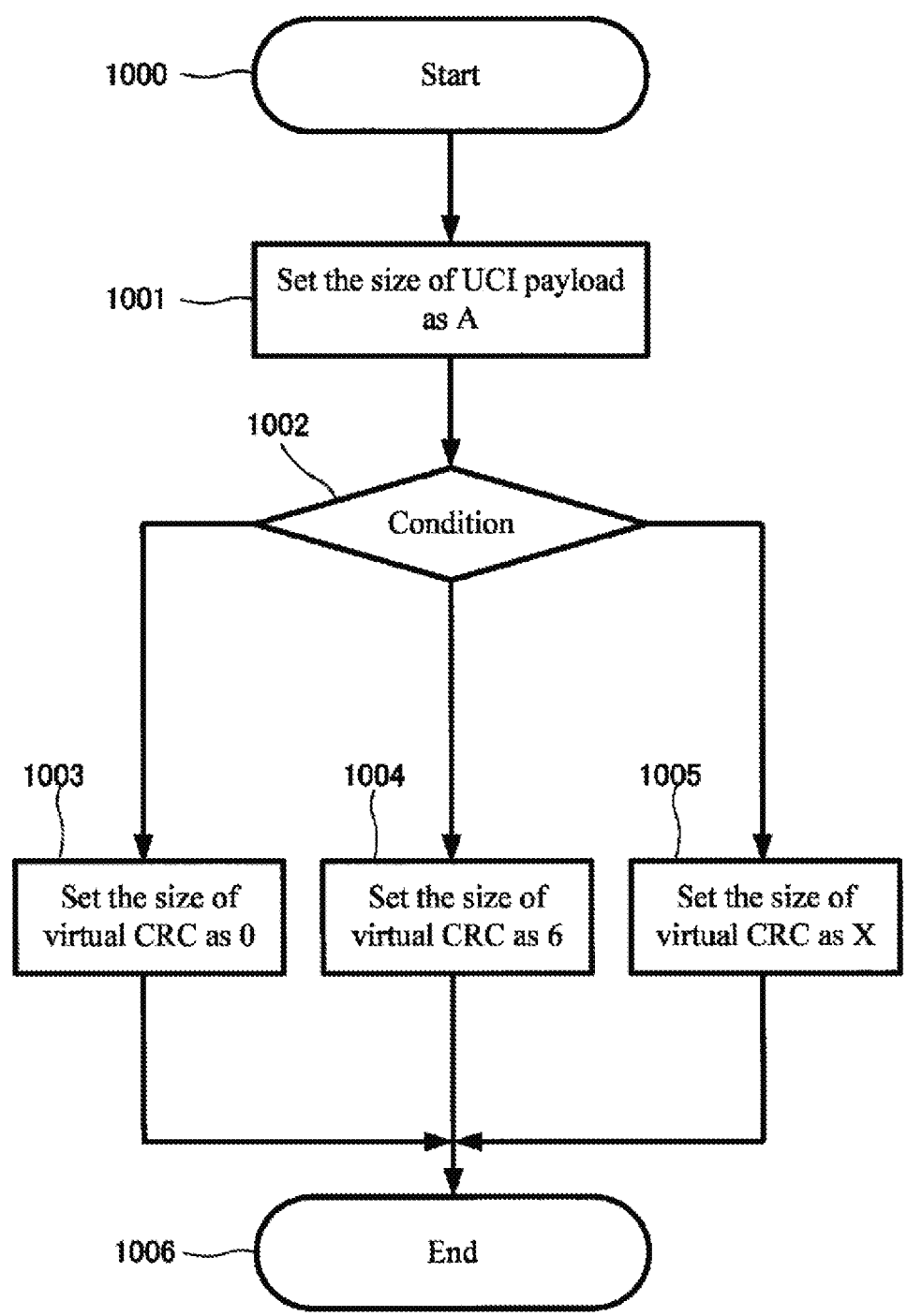
FIG. 10 is a diagram illustrating a flowchart for determining the size of virtual CRC bits according to the present embodiment.

FIG. 10 is a diagram illustrating a flowchart for determining the size of virtual CRC bits. In (1001), the terminal apparatus 1 sets the size of the UCI payload to A. In (1002), the terminal apparatus 1 determines the size of virtual CRC bits, based on at least the size A of the UCI payload. Here, in a case that A is less than Y1, the process proceeds to (1003). In a case that A is the same as or greater than Y1 and A is less than Y2, the process proceeds to (1004). In a case that A is the same as or larger than Y2, the process proceeds to (1005). Here Y1 may be 12. Y2 may be 20. For example, each of Y1 and Y2 may be a value satisfying Y1<Y2.

(1003) The terminal apparatus 1 configures the size of the virtual CRC bits to 0.

(1004) The terminal apparatus 1 configures the size of the virtual CRC bits to 6.

(1005) The terminal apparatus 1 configures the size of the virtual CRC bits to X.

X may be X1. In a case that A is less than Y3, X may be X1, and in a case that A is the same as or larger than Y3, X may be X2. Here, Y3 may be 360. X1 may be 11. X2 may be 22. For example, each of X1 and X2 may be a value satisfying X1<X2.

"Configuring the size of the virtual CRC bits to X1" may be "configuring the size of the CRC bits referenced to select the number of PRBs $M_{RB,min}^{PUCCH}$ of the PUCCH resource in an assumption that code block segmentation is not performed for the HARQ-ACK information." In other words, in a case that the size of the CRC bits referenced to select the number of PRBs $M_{RB,min}^{PUCCH}$ of the PUCCH resource is configured, the terminal apparatus 1 may assume that code block segmentation is not performed for the HARQ-ACK information. Even though the terminal apparatus 1 assumes that code block segmentation is not performed for the HARQ-ACK information in a case that the size of the CRC bits referenced to select the number of PRBs $M_{RB,min}^{PUCCH}$ of the PUCCH resource is configured, code block segmentation may be performed for the HARQ-ACK information, and the size of the CRC bits may be determined based on that code block segmentation is performed for the HARQ-ACK information.

"Configuring the size of the virtual CRC bits to X2" may be "configuring the size of the CRC bits referenced to select the number of PRBs $M_{RB,min}^{PUCCH}$ of the PUCCH resource in an assumption that code block segmentation is performed for the HARQ-ACK information." In other words, in a case that the size of the CRC bits referenced to select the number of PRBs $M_{RB,min}^{PUCCH}$ of the PUCCH resource is configured, the terminal apparatus 1 may assume that code block segmentation is performed for the HARQ-ACK information. Even though the terminal apparatus 1 assumes that code block segmentation is performed for the HARQ-ACK information in a case that the size of the CRC bits referenced to select the number of PRBs $M_{RB,min}^{PUCCH}$ of the PUCCH resource is configured, code block segmentation may not be performed for the HARQ-ACK information, and the size of the CRC bits may be determined based on that code block segmentation is not performed for the HARQ-ACK information.

In a case that A is less than Y3, the size of the virtual CRC bits and the size of the CRC bits added to the UCI payload may be the same. In a case that A is less than Y3, the size of the virtual CRC bits and the size of the CRC bits added to the UCI payload are given based on A.

In a case that A is greater than or the same as Y3, the size of the virtual CRC bits and the size of the CRC bits added to the UCI payload may be the same or different from each other. In a case that A is greater than or the same as Y3, the size of the virtual CRC bits is given based on A, and the size of the CRC bits added to the UCI payload is given based on A and E.

The size of the virtual CRC bits may be given regardless of the size of the rate matching output sequence $f^e_e$.

The number of PRBs $M_{RB,min}^{PUCCH}$ of the PUCCH resource is given based at least on the size of the virtual CRC bits given based on the size of the UCI payload.

The present embodiment may be applied to uplink control information. In other words, in the present embodiment, the above-described HARQ-ACK information may be uplink control information.

Hereinafter, various aspects of the terminal apparatus 1 and the base station apparatus 3 according to the present embodiment will be described.

(1) A first aspect of the present embodiment is a terminal apparatus configured to transmit a PUCCH, wherein the number of PRBs $M_{RB,min}^{PUCCH}$ of the PUCCH resource is given such that the sum of the number of bits A of the UCI and the number of CRC bits $O_{CRC,M-1}$ is greater than $V_{M-1}$, the number of the CRC bits is given by assuming that the number of PRBs of the PUCCH resource is $M_{RB,min}^{PUCCH}-1$, and the $V_{M-1}$ is given based on at least the $M_{RB,min}^{PUCCH}-1$.

(2) In the first aspect of the present embodiment, the $M_{RB,min}^{PUCCH}$ is given such that the sum of the number of bits A of the UCI and the second number of CRC bits $O_{CRC,M}$ is less than $V_M$, the second number of the CRC bits is the number of CRC bits in a case that the number of PRBs of the PUCCH resource is $M_{RB,min}^{PUCCH}$, and the $V_M$ is given based on at least the $M_{RB,min}^{PUCCH}$.

(3) A second aspect of the present embodiment is a base station apparatus configured to receive a PUCCH, wherein the number of PRBs $M_{RB,min}^{PUCCH}$ of the PUCCH resource is given such that the sum of the number of bits A of the UCI and the number of CRC bits $O_{CRC,M-1}$ is greater than $V_{M-1}$, the number of the CRC bits is given by assuming that the number of PRBs of the PUCCH resource is $M_{RB,min}^{PUCCH}-1$, and the $V_{M-1}$ is given based on at least the $M_{RB,min}^{PUCCH}-1$.

(4) In the second aspect of the present embodiment, the $M_{RB,min}^{PUCCH}$ is given such that the sum of the number of bits A of the UCI and the second number of CRC bits $(O_{CRC,M})$ is less than $V_M$, the second number of the CRC bits is the number of CRC bits in a case that the number of PRBs of the PUCCH resource is $M_{RB,min}^{PUCCH}$, and the $V_M$ is given based on at least the $M_{RB,min}^{PUCCH}$.

(5) A third aspect of the present embodiment is a terminal apparatus configured to transmit a PUCCH, the terminal apparatus including a transmitter configured to transmit a PUCCH including UCI to which the first CRC bits are added, wherein the number of PRBs $M_{RB,min}^{PUCCH}$ of the PUCCH resource is given based on the number of bits A of the UCI and the second number of CRC bits $O_{CRC,M-1}$, the first number of CRC bits is given based on the A and the $M_{RB,min}^{PUCCH}$, and the second number of CRC bits is given based on the A regardless of the $M_{RB,min}^{PUCCH}$.

(5) A fourth aspect of the present embodiment is a base station apparatus configured to receive a PUCCH, the base station apparatus including a transmitter configured to transmit a PUCCH including UCI to which the first CRC bits are added, wherein the number of PRBs $M_{RB,min}^{PUCCH}$ of the PUCCH resource is given based on the number of bits A of the UCI and the second number of CRC bits $O_{CRC,M-1}$, the first number of CRC bits is given based on the A and the $M_{RB,min}^{PUCCH}$, and the second number of CRC bits is given based on the A regardless of the $M_{RB,min}^{PUCCH}$.

According to the above, the terminal apparatus 1 and the base station apparatus 3 are capable of efficiently performing the uplink transmission and/or reception.

A program running on the base station apparatus 3 and the terminal apparatus 1 according to an aspect of the present invention may be a program (program that causes a computer to function) that controls a Central Processing Unit (CPU) and the like, such that the program realizes the functions of the above-described embodiments according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In such a case, a program for realizing such control functions may be recorded on a computer-readable recording medium to cause a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. The "computer-readable recording medium" refers to a portable medium such as a flexible disk, a magneto-optical disk, a ROM, a CD-ROM, and the like, and a storage apparatus such as a hard disk built into the computer system.

The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. The program may be configured to realize some of the functions described above, and also may be configured to be capable of realizing the functions described above in combination with a program already recorded in the computer system.

The base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. The terminal apparatus 1 according to the above-described embodiment can also communicate with the base station apparatus as the aggregation.

The base station apparatus 3 according to the above-described embodiment may serve as an Evolved Universal Terrestrial Radio Access Network (EUTRAN). The base station apparatus 3 according to the above-described embodiment may have some or all portions of the functions of a node higher than an eNodeB.

Some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. A circuit integration technique is not limited to the LSI, and may be realized with a dedicated circuit or a general-purpose processor. In a case that with advances in semiconductor technology, a circuit integration technology with which an LSI is replaced appears, it is also possible to use an integrated circuit based on the technology.

According to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of an aspect of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:
1. A terminal apparatus comprising:
a transmitter configured to transmit an uplink control information (UCI) payload with cyclic redundancy check (CRC) bits by using a physical uplink control channel (PUCCH), wherein:
a size of the CRC bits added to the UCI payload is a first size,
the number of physical resource blocks (PRBs) of a resource of the PUCCH is given based on a second size of the CRC bits,.
in a case that a size of the UCI payload is greater than or equal to 20 and less than 360, the first size is 11 and the second size is 11,
in a case that the size of the UCI payload is greater than or equal to 360, the second size is given based on the size of the UCI payload, and the first size is given based on the size of the UCI payload and a size of a rate matching output, and
the rate matching output is an output resulting from rate matching processing of a coding sequence related to the UCI payload.
2. A base station apparatus comprising:
a receiver configured to receive an uplink control information (UCI) payload with cyclic redundancy check (CRC) bits by using a physical uplink control channel (PUCCH), wherein:
a size of the CRC bits added to the UCI payload is a first size,
a number of physical resource blocks (PRBs) of a resource of the PUCCH is given based on a second size of the CRC bits,.

in a case that a size of the UCI payload is greater than or equal to 20 and less than 360, the first size is 11 and the second size is 11, in a case that the size of the UCI payload is greater than or equal to 360, the second size is given based on the size of the UCI payload, and the first size is given based on the size of the UCI payload and a size of a rate matching output, and the rate matching output is an output resulting from rate matching processing of a coding sequence related to the UCI payload.

3. A communication method for a terminal apparatus, the communication method comprising the step of:

transmitting an uplink control information (UCI) payload with cyclic redundancy check (CRC) bits by using a physical uplink control channel (PUCCH), wherein:

a size of the CRC bits added to the UCI payload is a first size, a number of physical resource blocks (PRBs) of a resource of the PUCCH is given based on a second size of the CRC bits,.

in a case that a size of the UCI payload is greater than or equal to 20 and less than 360, the first size is 11 and the second size is 11, in a case that the size of the UCI payload is greater than or equal to 360, the second size is given based on the size of the UCI payload, and the first size is given based on the size of the UCI payload and a size of a rate matching output, and the rate matching output is an output resulting from rate matching processing of a coding sequence related to the UCI payload.

4. A communication method for a base station apparatus, the communication method comprising the step of:

receiving an uplink control information (UCI) payload with cyclic redundancy check (CRC) bits by using a physical uplink control channel (PUCCH), wherein:

a size of the CRC bits added to the UCI payload is a first size, a number of physical resource blocks (PRBs) of a resource of the PUCCH is given based on a second size of the CRC bits,.

in a case that a size of the UCI payload is greater than or equal to 20 and less than 360, the first size is 11 and the second size is 11, in a case that the size of the UCI payload is greater than or equal to 360, the second size is given based on the size of the UCI payload, and the first size is given based on the size of the UCI payload and a size of a rate matching output, and the rate matching output is an output resulting from rate matching processing of a coding sequence related to the UCI payload.

* * * * *